Oct. 17, 1939.    E. E. WEMP    2,176,696
HUB CONSTRUCTION FOR CLUTCH MEMBERS OR THE LIKE
Filed July 3, 1937    2 Sheets-Sheet 1

INVENTOR.
Ernest E. Wemp
BY Barnes, Kisselle, Laughlin & Raisch
ATTORNEYS

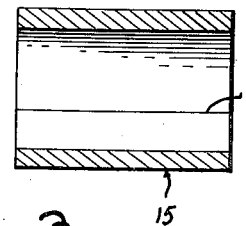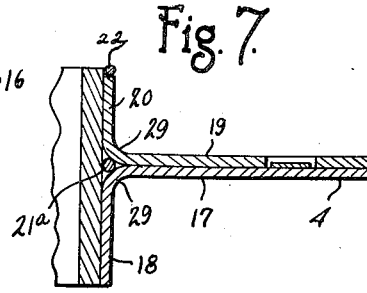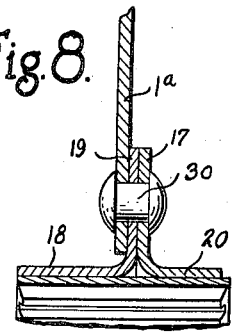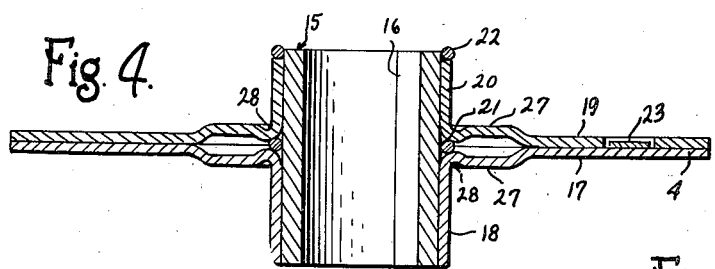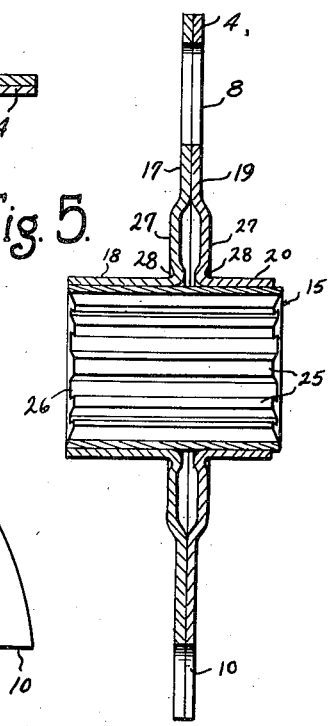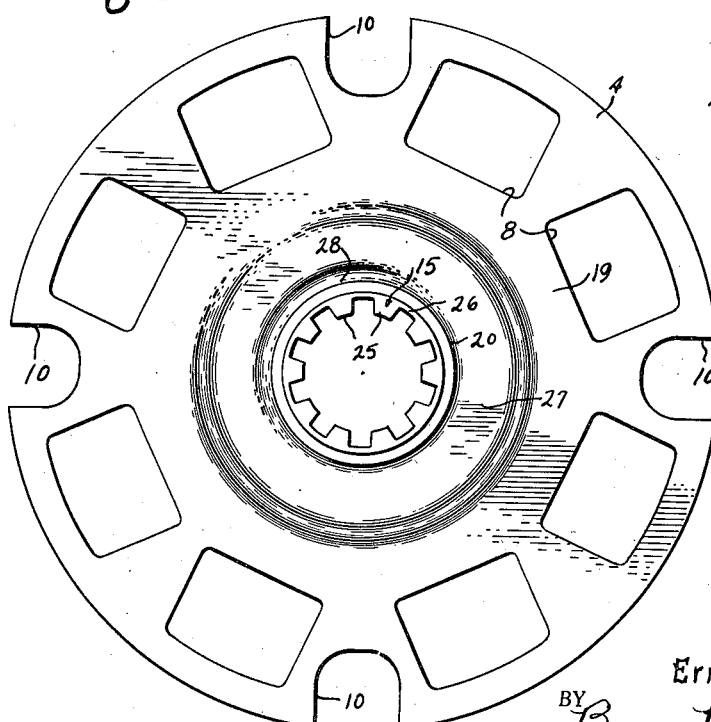

Patented Oct. 17, 1939

2,176,696

UNITED STATES PATENT OFFICE 2,176,696

HUB CONSTRUCTION FOR CLUTCH MEMBERS OR THE LIKE

Ernest E. Wemp, Detroit, Mich.

Application July 3, 1937, Serial No. 151,909

9 Claims. (Cl. 192—68)

This invention relates to a hub construction and its method of manufacture, and it has to do particularly with such a construction which may be embodied in the driven member of a clutch.

Among the objects of the invention is the provision of a structure formed of assembled parts fashioned from sheet-like metal. The several parts, after being suitably fashioned, are assembled together and then united by the use of a sealing metal which is rendered molten and which unites the parts by what may be termed a brazed joint. The sealing metal used is preferably a relatively high melting point metal such as copper or a suitable alloy containing copper, which metal may be broadly termed cuprous metal. This copper brazing practice has been heretofore performed on other objects and need not be considered in great detail herein. It is the aim of the invention to provide a structure of adequate strength for transmitting driving forces, while at the same time being formed from assembled sheet metal parts. Heretofore such clutch hub structures have been formed of one-piece forgings. While the invention will be described herein as directed to the provision of the hub structure for a driven member of a clutch, it will, of course, be appreciated that the hub structure may be used wherever hub structures of this nature are employed.

Fig. 3 is a view of a sleeve element prior to its assembly into the structure.

Fig. 4 is a cross sectional view of the hub assembly illustrating the same prior to the brazing operation.

Fig. 5 is a cross sectional view similar to Fig. 4 illustrating the completed hub structure.

Fig. 6 is an elevational view of the completed hub structure.

Fig. 7 is a view of a modified form of a hub structure.

Fig. 8 is a view of a still further modified form of the hub structure.

Figure 2:
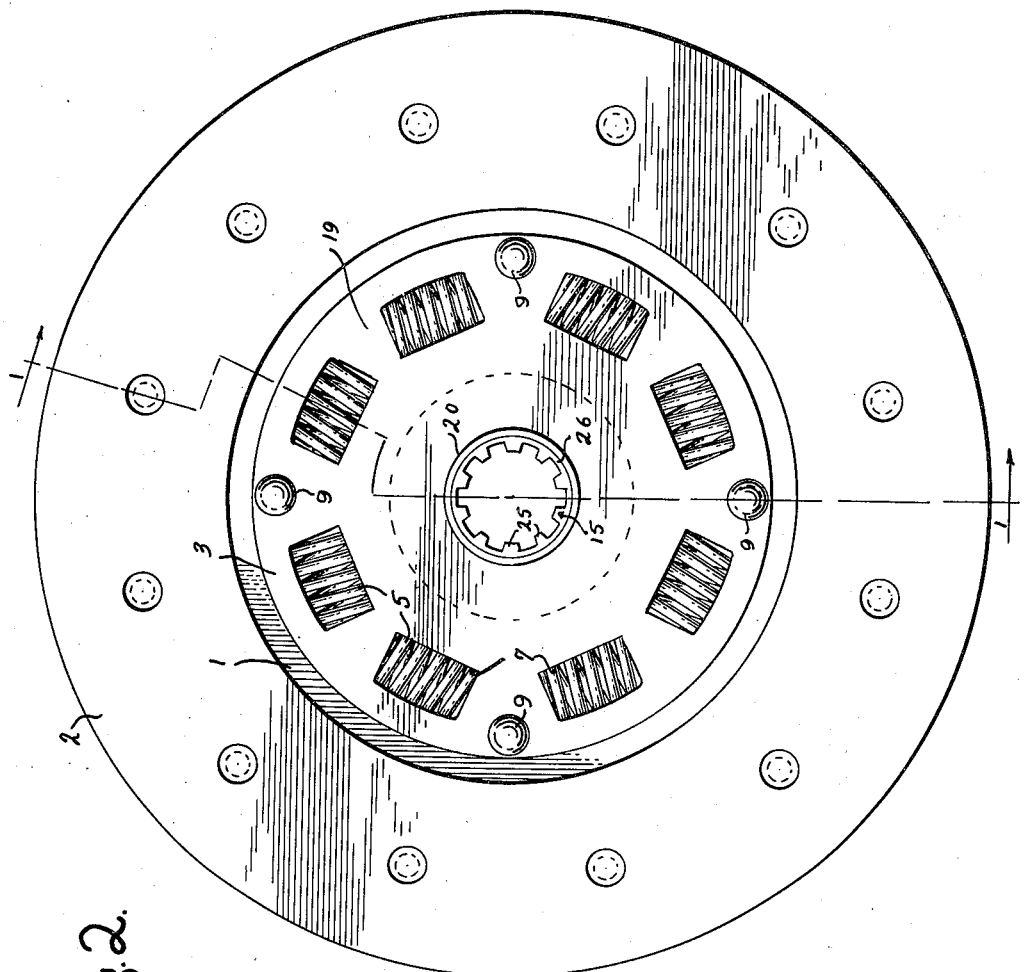
Fig. 2 is an elevational view thereof.
Figure 1:
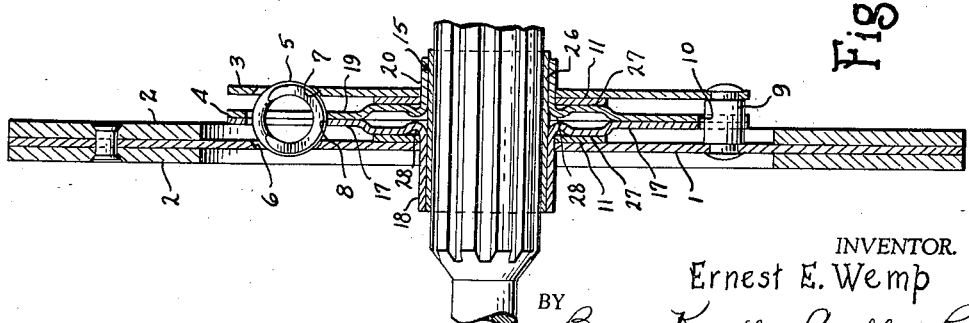
Fig. 1 is a cross sectional view substantially on line 1—1 of Fig. 2 illustrating a driven clutch member embodying the present invention.

The clutch member shown in Fig. 1 is one having a vibration dampener, and it comprises a disc body 1 with clutch facing material 2 attached thereto adjacent its outer periphery. As is well known to those versed in the art this facing material is designed to be packed between clutch driving members. A washer member 3 is disposed in axially spaced relation relative to the disc and lying between the disc and washer is the flange 4 of a hub. The flange, the disc and the washer have aligned openings or windows in which are disposed coil springs 5. The window in the disc is illustrated at 6, the window in the washer at 7, and the window in the flange of the hub at 8. This particular dampener structure may be substantially as illustrated in Patent No. 2,042,570 of June 2, 1936.

The disc and back washer are connected in driving relation by rivets 9 arranged to pass through notches 10 in the hub flange with some clearance so that the disc and washer may shift rotatively relative to the flange incident to spring flexure. This relative movement may be controlled frictionally as by means of interposed frictional material 11. The friction material 11 may be in the form of rings or buttons or the like and lie on opposite sides of the flange. The disc and washer may be tensioned against the friction material by the rivets 9 which are preferably short enough axially to place a tension on the inner portion of the disc and on the washer. The present construction of the hub is such that the thickness of the friction material is reduced to a minimum and this point will be touched upon more fully below. The driven member structure thus far described is subject to variation in structure and design, but this structure has been selected as one with which the hub may be used.

The elements going into the hub assembly are shown in Figs. 3 and 4, and these are formed from sheet metal stock preferably steel of requisite characteristics. The sleeve member 15 is shown in Fig. 3 and it is formed from metal stock fashioned into the sleeve with the edges of the stock abutting at a seam 16. A member fashioned from sheet stock is illustrated at 17 having a flange-forming portion, and a hub portion 18. A second similar member has a flange-forming portion 19 and a hub portion 20. These two members are placed over the sleeve 15 as illustrated in Fig. 4, preferably with a tight fit.

These three elements are now to be united by brazing them together. In this brazing operation a suitable quantity of cuprous metal is provided and then the assembly is passed through a furnace wherein a non-oxidizing or reducing environment is maintained. There are a number of ways of doing this, as for example, by maintaining in the furnace an atmosphere of a non-oxidizing or reducing nature such as hydrogen or other gases. One way of supplying the copper is by placing a copper wire in between the flange members 17 and 19, as illustrated at 21; the sleeve may extend slightly beyond the hub member 20 to provide a shoulder for the reception of a copper wire 22. One flange member may be provided with apertures for the reception of copper pieces 23. With the parts thus tightly assembled and the supply of copper in place, the assembly is passed through the furnace in a non-oxidizing environment. The copper is melted and it flows in between abutting surfaces, and upon being cooled the parts are copper brazed together. A copper brazed joint of this kind is found to be at its best when the parts to be united are in closely fitting relation. The copper in molten form readily flows in between substantially the entire abutting area of the flange-forming parts, between the sleeve and hub portions 18 and 20 and into the butt seam 16. The copper may be supplied in other ways, as for example by electrodepositing copper on some of the surfaces, or by mixing finely divided copper with a carrier so as to form a paste or paint, and applying this mix in the desired location.

The assembly may then be finished by marking the sleeve to form internal splines 25 as shown in Fig. 5. This may be a broaching operation. The apertures 8 may then be formed at the locations of the apertures initially formed to receive the copper 23.

It will be noted that the splines have a relatively great depth as compared to the thickness of the sleeve 15 which leaves only a relatively small thickness of metal remaining, as illustrated at 26. However, this is reenforced and strengthened by the hub forming portions 18 and 20. It is preferable that the sleeve and hub-forming portions 18 and 20 have a considerable axial extent, as this adds greatly to the strength and torque transmitting properties.

The flange-forming parts 17 and 19 may be fashioned with axially spaced portions so as to form seats 27 for the friction facing material. Thus the friction facing material may be greatly reduced in thickness as shown in Fig. 1, and this represents a saving in facing material without increasing the quantity of metal involved. If the flange had a uniform thickness equal to the thickness of the flange-forming parts 17 and 19, the facing material on each side of the flange would have to be thicker by the amount of the combined offsets, because the disc and back washer have to be spaced axially from the flange to accommodate the springs. In this form of structure the bend line between the flange-forming parts and the hub portions may be formed on a reverse radius as illustrated at 28, and with this structure the facings 11 may be extended inwardly into substantial abutting relationship with the hub forming parts 18 and 20.

The hub may be completed by the forming of recesses 10 therein to accommodate the rivets 9.

The invention may be applied to a structure where the flange-forming parts are not fashioned to provide spaced seats 27. This is shown in Fig. 7. In this form the flange-forming parts 17 and 19 extend radially inwardly and are connected to their hub portions on a radius 29. In this form the copper wire may be inserted as at 21*a*. With this form, however, the friction material will have to be positioned radially outwardly far enough in order to clear the metal at the radii 29.

The hub structure may be employed in a clutch driven disc which does not use a vibration dampener arrangement. This is shown in Fig. 8. The sleeve and hub and flange-forming parts carry the same reference characters as are used on the foregoing forms. However, the body member of the driven disc, as shown at 1*a*, may be jointed directly with the flange of the hub as by means of rivets 30.

In the appended claims the term "copper brazed" is used in connection with the pointing out and claiming of this invention. This term is to be construed as covering a braze wherein commercially pure copper is used, or where a copper alloy or its equivalent or a cuprous metal is employed.

I claim:

1. In a clutch driven member, a hub structure adapted to be mounted on a shaft to drive the same comprising, a sleeve formed of sheet metal and having opposite edges forming a seam, a pair of members fashioned from sheet metal and each having a hollow hub portion and a disc-like flange-forming portion extending radially outwardly therefrom, said members having their hub portions disposed over the sleeve and their flange portions disposed in abutting relationship, said abutting flange portions, said sleeve and hub portions, and the said edges forming the seam in the sleeve, being copper brazed together, said flange-forming portions providing a flange for connection to the body of a clutch driven member, and the internal surface of said sleeve being splined for connection to a shaft.

2. In a clutch driven member, a hub structure adapted to be mounted on a shaft to drive the same comprising, a sleeve formed of sheet metal and having opposite edges forming a seam, a pair of members fashioned from sheet metal and each having a hollow hub portion and a disc-like flange forming-portion extending radially outwardly therefrom, said members having their hub portions disposed over the sleeve and their flange portions disposed in abutting relationship, said abutting flange portions, said sleeve and hub portions, and the said edges forming the seam in the sleeve being copper brazed together, said flange-forming portions providing a flange for connection to the body of a clutch driven member, and the internal surface of said sleeve being broached into a configuration adapted to be keyed in driving relationship with a shaft.

3. In a clutch driven member, a hub structure adapted to be mounted upon a shaft to drive the same comprising, a sleeve, a pair of members fashioned from sheet metal and each having a hollow hub portion and a flange-forming portion extending radially outwardly therefrom, said members having their hub portions disposed over the sleeve and their flange-forming portions disposed in abutting relationship, said flange-forming portions being copper brazed together to form a flange adapted to be connected to the body of the clutch driven member, said hub portions being copper brazed to the sleeve whereby the sleeve and hub portions cooperate to form a hub for the flange, the internal surface of the sleeve being machined to be mounted upon a shaft in driving relation therewith.

4. A hub structure for a rotary torque transmitting element comprising, a sleeve, a pair of members each fashioned from sheet metal and each having a flange portion and a hollow hub portion, said hub portions being mounted over the sleeve and said flange portions being disposed in abutting relationship, said flange portions being copper brazed together, said hub portions being copper brazed to the sleeve, and the internal surface of said sleeve being fashioned to be mounted upon a shaft in driving relationship therewith.

5. A hub structure for a rotary torque transmitting element comprising, a sleeve fashioned from sheet metal and having its opposite edges forming a seam, a pair of members each fashioned from sheet metal and each having a flange portion and a hollow hub portion, said hub portions being mounted over the sleeve and said flange portions being disposed in abutting relationship, said flange portions being copper brazed together, said hub portions being copper brazed to the sleeve, said opposite edges of the sleeve being copper brazed together to close the seam, and the internal surface of said sleeve being fashioned to be mounted upon a shaft in driving relationship therewith.

6. A hub structure for a rotary torque transmitting element comprising, a sleeve fashioned from sheet metal and having its opposite edges forming a seam, a pair of members each fashioned from sheet metal and each having a flange portion and a hollow hub portion, said hub portions being mounted over the sleeve and said flange portions being disposed in abutting relationship, said flange portions being copper brazed together, said hub portions being copper brazed to the sleeve, said opposite edges of the sleeve being copper brazed together to close the seam, the internal surface of the sleeve having splines broached therein and adapted to be mounted upon a splined shaft in driving relationship therewith.

7. A clutch driven member comprising, a hub with a flange, a disc body member carrying facing material having its inner portion extending along one side of the flange, a washer member extending on the opposite side of the flange, said disc body member and washer member being spaced axially from the flange, the disc body member, flange and washer having substantially aligned openings therein, coil springs disposed in the aligned openings arranged to transmit forces to and from the disc body member and hub, means tying the disc body member and washer together, said flange having a part next adjacent the hub relatively thick as compared to the remaining portion of the flange whereby to minimize the axial spacing of the disc body member and washer relative to this thick portion of the flange, and relatively thin friction material between said thickened portion of the flange and the disc body member and washer.

8. A clutch driven member comprising, a disc carrying facing material, a washer spaced axially from the disc and connected thereto in driving relationship, a hub member having a flange disposed between the disc and washer with the disc and washer spaced axially with respect thereto, a plurality of aligned openings in the disc the washer and the flange, a coil spring in each group of aligned apertures for transmitting driving force, said hub comprising two sheet metal parts each having a hub portion and a flange portion projecting outwardly therefrom, said flange portions being copper brazed together to form the above mentioned flange and the hub portions cooperating to provide the above mentioned hub, said flanged portions being in abutting relationship from the periphery thereof inwardly to a point spaced outwardly from the hub portions, the flange-forming portions being spaced axially away from each other between said point and the hub portions, whereby to take up some of the clearance between the disc and washer and forming friction seats for facing material, and relatively thin friction facing material between said seats and the disc and washer.

9. A clutch driven member comprising, a hub with a flange, a disc carrying facing material, the inner portion of which disc lies along one side of the flange, a washer lying on the opposite side of the flange, said disc and washer being axially spaced from the flange, the disc, the flange and the washer having aligned openings, a coil spring in each group of openings for transmitting forces to and from the disc and hub, friction material between the flange and disc and between the flange and washer, said flange having other openings therein, and driving means connecting the disc and washer in driving relation adjacent the outer periphery of the washer and passing through said other openings with clearance, said means serving to tension the disc and washer toward each other and into frictional engagement with said friction material and constituting the sole means for holding the disc, the washer and the friction material in engagement.

ERNEST E. WEMP.